(12) United States Patent
Park et al.

(10) Patent No.: US 6,181,794 B1
(45) Date of Patent: Jan. 30, 2001

(54) ECHO CANCELER AND METHOD THEREOF

(75) Inventors: Ho-Chong Park, Seongnam; Young-Ky Kim, Seoul, both of (KR)

(73) Assignee: Samsung Electronics Co., Ltd. (KR)

( * ) Notice: Under 35 U.S.C. 154(b), the term of this patent shall be extended for 0 days.

(21) Appl. No.: 08/946,267

(22) Filed: Oct. 7, 1997

(30) Foreign Application Priority Data

Mar. 7, 1997 (KR) ............................... 1997-7674

(51) Int. Cl.[7] .................. H04M 9/08; H04B 3/23
(52) U.S. Cl. .......................... 379/410; 370/291
(58) Field of Search .................. 379/406, 410, 379/411, 407, 408, 409, 345; 364/724.19; 704/219; 370/290, 287, 291; 708/322

(56) References Cited

U.S. PATENT DOCUMENTS

| | | | |
|---|---|---|---|
| 3,787,645 | * 1/1974 | Ochiai et al. | 379/410 |
| 4,918,727 | * 4/1990 | Rohrs et al. | 379/410 |
| 5,274,705 | * 12/1993 | Younce et al. | 379/410 |
| 5,353,374 | * 10/1994 | Wilson et al. | 704/219 |
| 5,644,635 | * 7/1997 | Armbruster | 379/410 |
| 5,664,011 | * 9/1997 | Crochiere et al. | 379/406 |
| 5,745,564 | * 4/1998 | Meek | 379/406 |
| 5,761,638 | * 6/1998 | Knittle et al. | 379/410 |
| 5,790,632 | * 8/1998 | Antonio et al. | 379/410 |
| 5,796,819 | * 8/1998 | Romesburg | 379/406 |
| 5,812,537 | * 9/1998 | Betts et al. | 379/410 |

\* cited by examiner

*Primary Examiner*—Wing F. Chan
(74) *Attorney, Agent, or Firm*—Dilworth & Barrese, LLP (57) ABSTRACT

An echo canceler for canceling an echo signal mixed in an input signal received from a hybrid circuit. The echo canceler has a double filter structure comprised of an adaptive filter and a fixed filter. The adaptive filter receives the input signal to generate a first echo estimation signal according to a filter coefficient thereof, and the fixed filter receives the input signal to generate a second echo estimation signal according to a filter coefficient thereof. A first adder subtracts the first echo estimation signal from the input signal to generate a first echo-canceled signal, and a second adder subtracts the second echo estimation signal from the input signal to generate a second echo-canceled signal. A mode selector selectively outputs one of the first and second echo-canceled signals having a relatively more canceled echo component.

12 Claims, 7 Drawing Sheets

ECHO CANCELER AND METHOD THEREOF

BACKGROUND OF THE INVENTION

1. Field of the Invention

The present invention relates to an echo canceler, and more particularly to an apparatus and method for canceling an echo signal by using an adaptive filter.

2. Description of the Related Art

Figure 1:
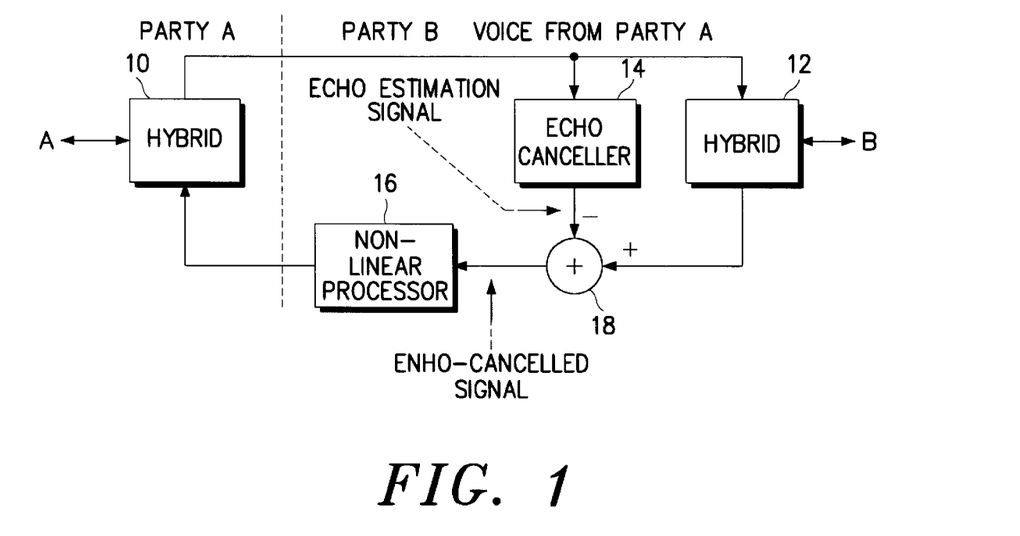
FIG. 1 shows a block diagram of a general echo canceler.

In a telecommunication system, an echo phenomenon is generally caused due to an impedance mismatch of hybrid circuits for a 4-wire-to-2-wire conversion. Referring to FIG. 1, a voice signal is transferred from a party A to a party B through hybrid circuits 12, some signal components may echo back to the party A due to an impedance mismatch of the hybrid circuits 12. Such an echo signal may be canceled by an echo canceler 14.

It can be understood that a relationship between the voice signal from the party A and the echo signal may be estimated by using an adaptive filter, since the voice signal and the echo signal have an input-output relationship with respect to the hybrid circuit 12. That is, if the adaptive filter receiving the voice signal from the party A is repeatedly trained such that the output signal thereof becomes identical to the echo signal, then the adaptive filter will have the same input-output relationship as that of the hybrid circuit 12. At the moment, the voice signal from the party A is filtered by the adaptive filter to estimate the echo signal, and the echo estimation signal is subtracted from the original echo signal, thereby canceling the echo signal.

A filter coefficient of the adaptive filter should be repeatedly updated to maintain the optimal status of the adaptive filter, at all times. However, if the adaptive filter is repeatedly updated even in a double-talk status in which the voice signals from the parties A and B are simultaneously received, the adaptive filter will diverge. To prevent the divergence of the adaptive filter, updating of the adaptive filter should be temporarily stopped. Further, to stop the updating, it is necessary to know whether the voice signal from the party B is received or not. For that purpose, the voice signal from the party A is compared with the echo signal. As the result of the comparison, if the echo signal is relatively larger than the voice signal from the party A, it is considered that the voice signal from the party B is now received. Alternately, it is continuously checked whether the adaptive filter diverges or not, to determine that the voice signal from the party B is received if the adaptive filter diverges in the interim.

Although the echo signal is canceled by using the above-stated echo canceler 14, a residual echo signal may be generated due to quantization noises of the voice signal and the noises from the party B. In order to lower a level of the residual echo signal, the echo canceled signal is applied to a non-linear processor 16 which unconditionally sets a level of the noise signal to zero by using a center clipping apparatus.

If double-talk is not accurately detected, the echo canceler 14 diverges. In that case, the party A may hear loud noises, which drastically degrades speech quality of the communication system. However, in case of using a level difference between the voice signal from the party A and the echo signal to detect double-talk, it is difficult to accurately detect double-talk, since the level difference between two echo signals is not high enough when the voice signal from the party B has a low level. Further, the system performance is dependent upon the level difference between the voice signal from the party A and the echo signal, which becomes a reference in detecting double-talk. In case the level difference is incorrectly evaluated, double-talk may not be detected. Moreover, since the level difference undergoes a change according to the features of the hybrid circuits, it is difficult to fixedly set the value to a particular value.

In using the convergence of the adaptive filter to detect double-talk, it is difficult to set a reference value for detecting double-talk, at which the adaptive filter converges. Further, the reference value undergoes a change according to the background or surroundings. Thus, if the reference value is fixed to a particular value, the system may not have a good performance.

If the non-linear processor 16 is employed by using the center clipping apparatus, the signals with the lower level are converted to zero values and transferred to the party A, which may create a discontinuity problem of the received signal. Further, since such a system detects double-talk depending upon the signal level, the voice signal with the lower level from the party B may not be successfully transferred to the party A.

SUMMARY OF THE INVENTION

It is therefore an object of the present invention to provide an echo canceler for effectively canceling an echo signal in a double-talk status and a method thereof.

It is another object of the present invention to provide an echo canceler including a double filter structure comprised of an adaptive filter and a fixed filter, in which the filters receive the same input signal to cancel the echo signal, and a signal output from one of the filters is selectively outputted so as to effectively cancel the echo signal, and a method thereof.

It is still another object of the present invention to provide an echo canceler interposed between a vocoder and a hybrid circuit in a digital cellular system, to improve a feature of the vocoder, and a method thereof.

To achieve the above objects, an echo canceler for canceling an echo signal according to the present invention includes an adaptive filter for receiving the input signal to generate a first echo estimation signal according to a filter coefficient of the filter. A fixed filter receives the input signal to generate a second echo estimation signal according to a filter coefficient of the fixed filter. A first adder subtracts the first echo estimation signal from the input signal received from the hybrid circuit to generate a first echo-canceled signal. A second adder subtracts the second echo estimation signal from the input signal received from the hybrid circuit to generate a second echo-canceled signal. A mode selector for selectively outputting one of the first and second echo-canceled signals having a relatively more canceled echo component.

BRIEF DESCRIPTION OF THE DRAWINGS

The above and other objects, features and advantages of the present invention will become more apparent in the light of the following detailed description of an exemplary embodiment thereof taken with the attached drawings in which.

DETAILED DESCRIPTION OF THE PREFERRED EMBODIMENT

Preferred embodiments of the present invention will be described in detail hereinbelow with reference to the attached drawings, in which the like reference numerals represent the like elements.

Figure 2:
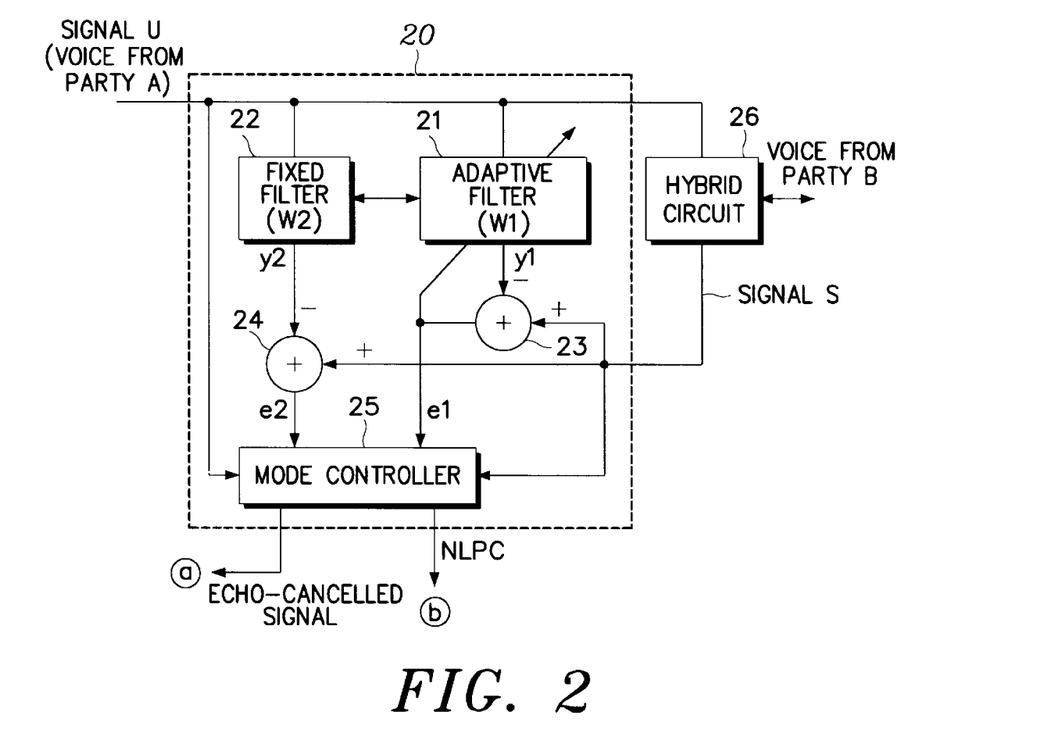
FIG. 2 shows a block diagram of an echo canceler according to an embodiment of the present invention.

FIG. 2 shows an echo canceler according to an embodiment of the present invention. As illustrated, a hybrid circuit 26 transfers a first voice signal U received from a party A to a party B, and/or transfers a second voice signal S received from the party B to the party A. Here, a signal transferred from the hybrid circuit 26 to an echo canceler 20 includes an echo signal and a near-end echo signal of the party B. An adaptive filter (W1) 21 receives the first voice signal U and generates a first echo estimation signal y1. A fixed filter (W2) 22 receives the first voice signal U and generates a second echo estimation signal y2. Here, the adaptive filter 21 employs an NLMS (Normalized Least Mean Square) adaptive algorithm. An offset device (adder) 23 subtracts the first echo estimation signal y1 from the output signal S of the hybrid circuit 26, to generate a first echo-canceled signal e1. Similarly, an offset device (adder) 24 subtracts the second echo estimation signal y2 from the output signal S of the hybrid circuit 26, to generate a second echo-canceled signal e2. A mode controller 25 receives the first and second voice signals U and S, and the first and second echo-canceled signals e1 and e2, to detect double-talk. The mode controller 25 selectively generates one of the first and second echo-canceled signals e1 and e2 in accordance with the results of double-talk detection. At that instant, the mode controller 25 further generates a non-linear process control signal (NLPC).

Figure 3:
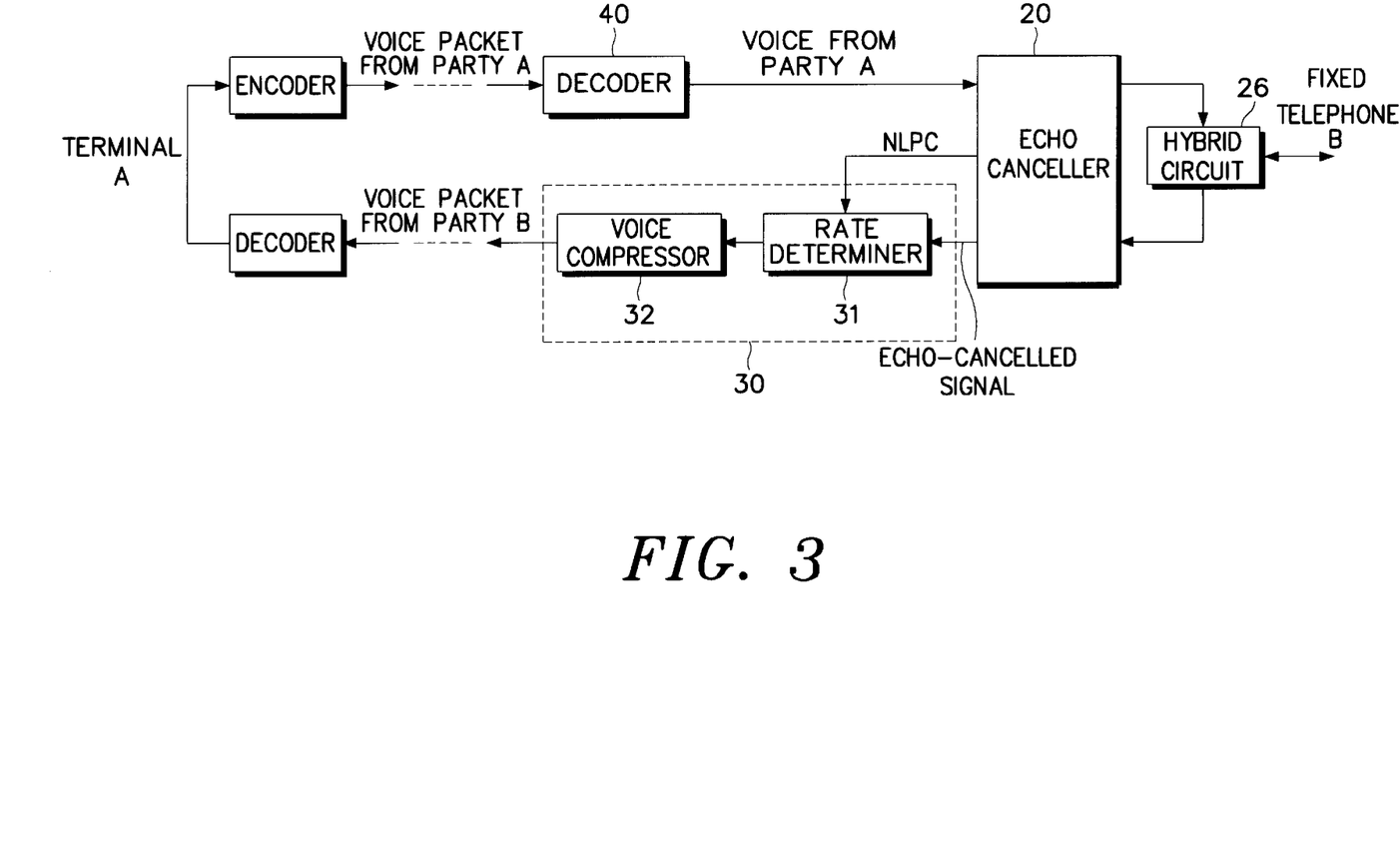
FIG. 3 shows a block diagram of a CDMA digital cellular system to which the echo canceler of FIG. 2 is connected.

FIG. 3 illustrates the echo canceler 20 of FIG. 2 interposed between the hybrid circuit 26 and an encoder 30 of a CDMA (Code Division Multiple Access) digital cellular system. As illustrated, the encoder 30 includes a rate determiner 31 for determining a data rate based on the non-linear process control signal NLPC from the mode controller 25 of the echo canceler 20 and outputting the echo-canceled signal from the mode controller 25 based on the determined rate. Further, the encoder 30 includes a voice compressor 32 for coding the voice according to the rate output from the rate determiner 31.

In a CDMA digital cellular system shown in FIG. 3, the echo canceler 20 is interposed between the encoder 30 and the hybrid circuit 26 to cancel the echo signal from the received signal and generate the echo-canceled signal to the encoder 30. At the same moment, the echo canceler 20 generates the non-linear process control signal NLPC. Then, the encoder 30 determines the data rate of the voice compressor 32 according to the non-linear process control signal NLPC, to non-linearly process the echo-canceled signal received from the mode controller 25.

Frequently, the digital cellular system undergoes a transmission time delay in the course of coding and transmitting the voice signal. Therefore, it is preferred that a base station should have a capability of controlling the echo signal returning from a PSTN (Public Switched Telephone Network) interface. The present invention provides a novel echo canceler for use in the CDMA digital cellular system. Although the echo canceler according to the present invention is based on the known NLMS adaptive algorithm, the echo canceler is featured by a unique structure having the adaptive filter and the fixed filter. Further, the echo canceler utilizes the features of a speech coder for use in the CDMA cellular system, to improve performance. The complexity of the echo canceler of the present invention is low enough so that a single DSP (Digital Signal Processor) chip can drive, in real time, a full duplex vocoder and the echo canceler.

Referring back to FIG. 1, the digital communication system needs to have devices for controlling the echo signal returning from the hybrid circuits 10 and 12 of the PSTN interface, because of the long delay time between the voice coding and the voice transmission. For example, the encoder 30 in the CDMA digital cellular system shown in FIG. 3 has a voice delay time of 55 msec.

In a preferred embodiment of the present invention, the echo canceler for use in the CDMA cellular system has a double filter structure, i.e., the adaptive filter 21 and the fixed filter 22. The filters 21 and 22 drastically improve an echo canceling feature of the echo canceler 20, particularly in case of double-talk. Moreover, the echo canceler 20 of the invention utilizes the speech coder for use in the CDMA digital cellular system, to further improve the echo canceling feature. For example, frame-based speech processing can measure the features of the filters, without an additional transmission time delay, thus improving the reliability of the echo canceler. The above-mentioned speech coder can readily provide the non-linear processor with a reduced level of returning the echo signal below an audible level.

The echo canceler 20 according to the present invention includes the following advantageous features:

First, the echo canceler 20 performs echo canceling even in the case of double-talk. It is very important that the echo canceler 20 detects double-talk accurately, since the adaptive filter 21 quickly generates its output during double-talk. In general, double-talk is detected by using an energy level based on the assumption that a loss caused through an echo path is at least 6 dB. However, since the loss through the echo path and the level of the near-end input signal through the echo path vary for the respective calls, this method may not detect an accurate double-talk duration.

Second, the echo canceler 20 has a quick initial convergence and a low echo level after the convergence. Although the echo canceler 20 utilizes the non-linear processor for that purpose, the processor should not create any discontinuity problem during the telephone conversation.

Third, the echo canceler 20 adapts to an unexpected change of the echo path. The echo canceler 20 operates normally, even if a loss of the echo path is infinity, i.e., if the echo signal is never generated.

Fourth, the echo canceler 20 does not depend on the absolute signal level. That is, the echo canceler 20 operates independently of the absolute signal level.

Fifth, the echo canceler 20 is not be complex in construction. The echo canceler 20 has a single DSP chip installed together with the full duplex vocoder.

The voice compressor 32 in the encoder 30 is implemented by a vocoder standard IS-96A QCELP. The vocoder 32, i.e., the voice compressor 32, has the following functions to improve the performance of the echo canceler 20.

First, the encoder 30 processes the signal by the frame unit of 20 msec, not sample by sample, thereby improving the performance of the echo canceler 20.

Second, the voice compressor 32 fundamentally has functions to suppress the voice signal. In case the input signal level is low, the encoder 30 generates white noise having the same level as that of the input signal, instead of generating the voice signal. This function is used in performing the non-linear processor of the echo canceler 20.

Referring again to FIG. 2, the echo canceler 20 includes the adaptive filter 21 and the fixed filter 22. The adaptive filter 21 has a filter coefficient which is updated according to the NLMS adaptive algorithm. The fixed filter 22 has a filter coefficient which can be copied from the adaptive filter 21, if necessary. The filters 21 and 22 generate the repetitive echo signals using particular filter coefficients, and generate the respective error signals such as the first and second echo-canceled signals e1 and e2. Thus, the filters 21 and 22 have different filter coefficients, respectively. The mode controller 25 selectively outputs one of the error signals (i.e., echo-canceled signals) e1 and e2. At that instant, the selected filter is called an in-use filter, and the other non-selected filter is called a non-use filter. The mode controller 25 determines which of the filters is to be used. The features of the filters 21 and 22 are estimatable based on the powers of the error signals. That is, as receiving the same input signal, the filters 21 and 22 have the error signal powers, which are ERLEs (Echo Return Loss Enhancement values) of the respective filters compared. As a result, the filter having the lower power is selected by the mode controller 25 as the in-use filter.

In operation, at a first step, the filters 21 and 22 have their coefficients initialized to zero, and the fixed filter 22 is set as the in-use filter. At a second step, the feature of the adaptive filter 21 is compared with the feature of the fixed filter 22 at the end of the 20 msec frame, to select the in-use filter. At a third step, the filter coefficient of the selected in-use filter is copied to the nonuse filter. At a fourth step, the filters 21 and 22 are set to have the same coefficient and start the next frame. At a fifth step, the procedure returns to the second step to repeat the above stated processes.

The relatively higher ERLE means that the echo signal is accurately canceled out by the in-use filter. In this case, the echo signal can be suppressed to cancel the residual echo signal. However, the near-end voice input is not suppressed, because ERLE cannot become so high in case the voice signal exists at the near-end. The echo signal may be readily suppressed by utilizing the features of the encoder 30. When the encoder 30 operates at ⅛ rate which is the minimum rate, the input signal may be disregarded and the white noise with the same level is generated.

In a particular case, if ERLEs of the filters 21 and 22 are below zero with respect to several consecutive frames, neither of the filters can accurately cancel the echo. In this case, the echo canceler 20 operates as an adder. It is preferable to re-initialize the echo canceler 20 to all zero coefficients.

The echo canceler 20 having the above mentioned construction can perform the following functions. First, the echo canceler 20 has improved performance during double-talk, since it is not necessary to detect double-talk. If double-talk is generated after the convergence, the adaptive filter 21 quickly diverges while the fixed filter 22 maintains the convergence status. Therefore, during double-talk, ERLE of the fixed filter 22 becomes higher than ERLE of the adaptive filter 21, and the echo signal is accurately canceled by the fixed filter 22. When double-talk is completed, the adaptive filter 21 quickly converges again. In this manner, the echo canceler 20 may maintain the improved performance during double-talk.

In practice, it is preferable that the adaptive filter 21 operates inadaptively during double-talk, because there may exist a mutual dependence between a far-end voice and a near-end voice, which undesirably causes the convergence of the adaptive filter 21. For this purpose, double-talk using its energy level is detected. In this case, there is no need to detect an accurate double-talk duration, the decision rule is very conservative.

Second, the echo canceler 20 has a quick initial convergence and has a low echo level after the convergence. The echo signal is immediately suppressed by the echo suppression function, and the echo level becomes very lower after the convergence. Further, since the suppression is achieved within a routine of the encoder 30, discontinuities may never be caused.

Third, the echo canceler 20 quickly adapts to the change of the echo path. Since the adaptive filter 21 is always adaptive except for a powerful double-talk duration, the echo canceler 20 quickly adapts to the change of the echo path. If the loss of the echo path is infinity, ERLEs of the filters 21 and 22 drop below zero. Then, the echo canceler 20 is again initialized, and the fixed filter 22 operates with the zero coefficient. The adaptive filter 21 never converges, since the echo signals are not generated. Therefore, the echo canceler 20 may not effectively operate.

Fourth, the echo canceler 20 is independent of the absolute signal level. Since the echo canceler 20 operates based on a filter selection procedure using a relative ERLE measurement, the feature of the echo canceler 20 does not depend on the absolute signal level.

Fifth, the echo canceler 20 has a low complexity. Since the echo canceler 20 uses two types of filters, the echo canceler 20 is less complex. However, a high-qualified DSP chip such as "TMS320C31" manufactured by Texas Instruments Inc. U.S.A., may cover the encoder 30, decoder 40, and echo canceler 20.

In the light of the simulation results of the echo canceler 20 having the above mentioned construction, a first input signal U is a zero-mean unit-variance white Gaussian noise, and a near-end noise 'n' is the zero-mean unit-variance white Gaussian noise of SNR=−40. Further, a tap size of the adaptive filter 21 is 256, and an NLMS adaptive algorithm having a gain of 0.5 is used. FIGS. 4 to 7 illustrates characteristic curves showing ERLEs of the filters 21 and 22. Actually, the ERLE of the echo canceler 20 is one of the ERLEs of the adaptive filter 21 or the fixed filter 22, which is selected to have a higher value during a filter selection procedure. ERLEs of the filters with respect to each frame may be evaluated by the following Equation (1).

$$ERLE(k) = 10 \times \log \frac{\sum_{i=k \times 160}^{k \times 160+159} (S_i - B_i)^2}{\sum_{i=k \times 160}^{k \times 160+159} er_i^2}$$

where k represents the frame B represents the voice from party B, and er represents the first and second echo-canceled signals e1 and e2 of the adaptive filter 21 and the fixed filter 22.

Figure 4:
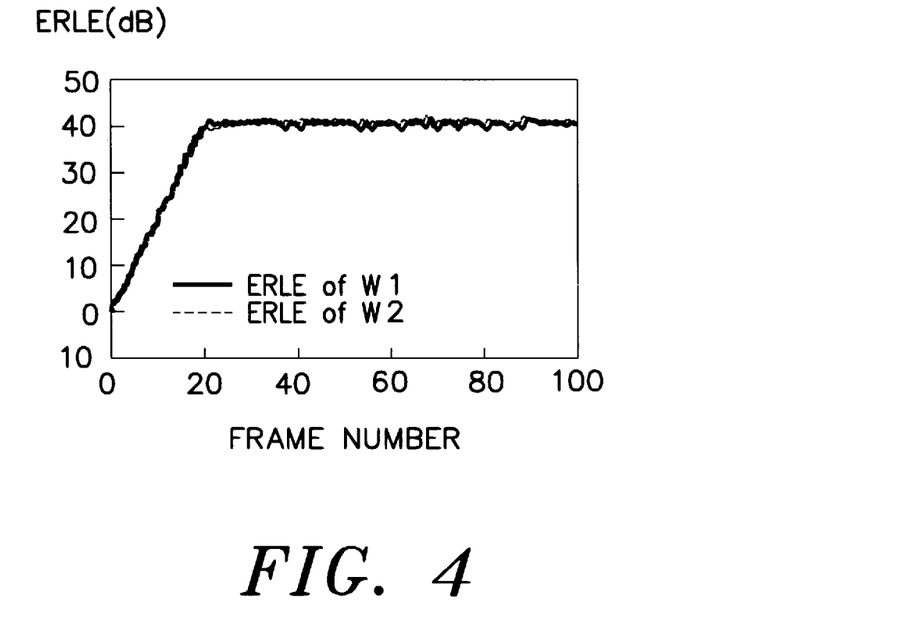
FIG. 4 shows a convergence characteristic curve of the echo canceler in a normal operation mode.

FIG. 4 illustrates a convergence characteristic curve of the echo canceler 20 in a normal operation mode. Since the fixed filter 22 maintains the coefficient copied from the adaptive filter 21, the ERLE of the fixed filter 22 tracks the ERLE of the adaptive filter 21.

Figure 6:
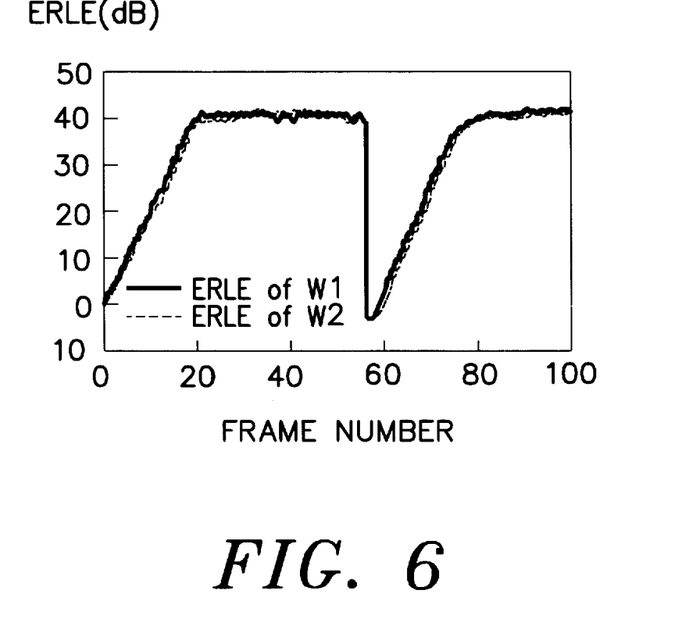
FIG. 6 shows a characteristic curve of the echo canceler during a change in an echo path.

FIG. 6 illustrates how the echo canceler 20 adapts to the change of the echo path. The echo path changes at the middle of a fifty-sixth frame. The filters 21 and 22 first diverge at the same time. Then, the adaptive filter 21 quickly converges in adaptation to the new echo path, and the fixed filter 22 converges along the adaptive filter 21.

Figure 5:
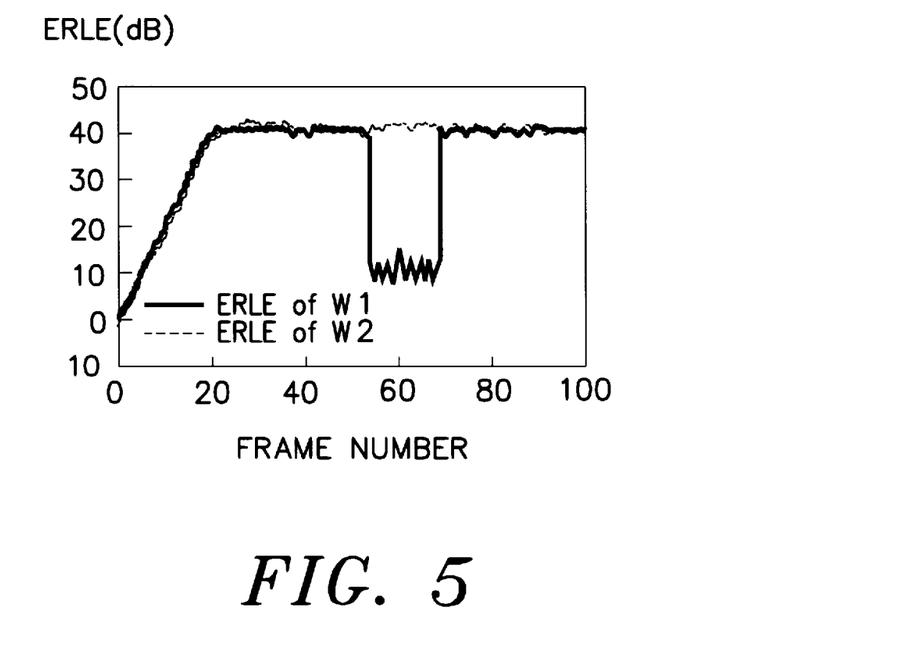
FIG. 5 shows a characteristic curve of the echo canceler in a double-talk mode.

FIG. 5 illustrates a characteristic curve of the echo canceler 20 during double-talk. As illustrated, double-talk is generated from a fifty-sixth frame to a sixty-eighth frame. The adaptive filter 21 quickly diverges during double-talk, due to an influence from the near-end. However, the fixed filter 22 maintains the convergence status having the coefficient obtained at the preceding frame. Therefore, it is noted that during double-talk duration, the fixed filter 22 is used and the echo canceler 20 operates normally. Upon completion of double-talk, the adaptive filter 21 again converges.

Figure 7:
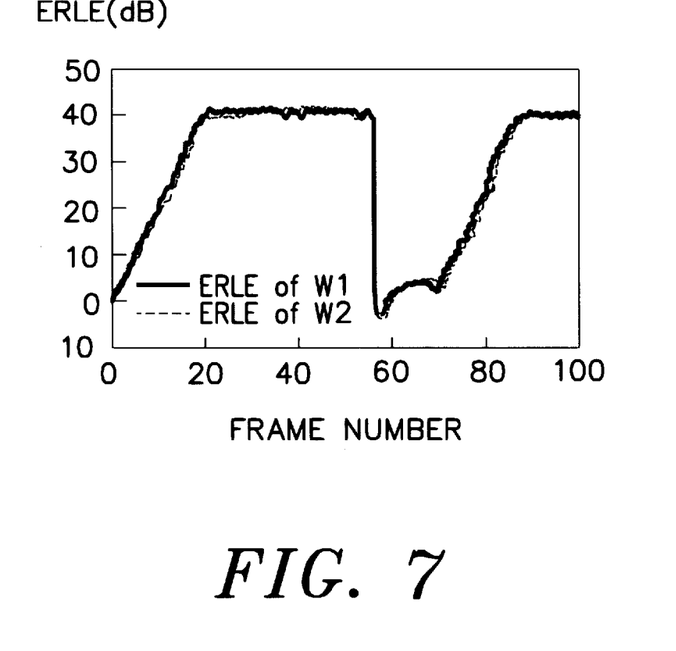
FIG. 7 shows a characteristic curve of the echo canceler in case double-talk and the echo path are simultaneously generated and changed.

FIG. 7 illustrates a characteristic curve in the case where double-talk and the echo path are simultaneously generated and changed. At the beginning of the change of the echo path, both the filters 21 and 22 diverge and maintain the divergence status, since the adaptive filter 21 can not converge during double-talk. Upon the completion of double-talk, the adaptive filter 21 converges and then, the fixed filter 22 converges.

As can be appreciated from the foregoing description, the echo canceler 20 according to an embodiment of the present invention has a double filter structure comprised of the adaptive filter 21 and the fixed filter 22. The filters 21 and 22 receive the same voice signal to generate the first and second echo estimation signals y1 and y2, respectively. Then, the filters 21 and 22 offset the first and second echo signals y1 and y2 against the input voice signal to generate the first and second echo-canceled signals e1 and e2. Then, the mode controller 25 selectively outputs one of the first and second echo-canceled signals e1 and e2, together with the non-linear process control signal NLPC. Then, the encoder 30 determines the rate according to the non-linear process control signal NLPC, and processes the echo-canceled signal input.

Here, the encoder 30 and the echo canceler 20 operate by the frame unit of 20 msec. That is, the echo canceler 20 receives the input signals for 20 msec and cancels the echo signal therefrom. The encoder 30 receives and compresses the echo-canceled signals from the echo canceler 20 to convert the compressed signals into a voice packet. The echo canceler 20 starts a new frame every 20 msec, and receives the signals stored into a voice signal buffer and an echo signal buffer. Here, the echo signal buffer has the size of 160, and stores 160 sample echo signals received during the last period of 20 msec. Further, the voice signal buffer has the size of 160+N (tap size of the echo canceler), and stores 160 sample voice signals for the last 20 msec plus the preceding N sample voice signals.

Figure 8A:
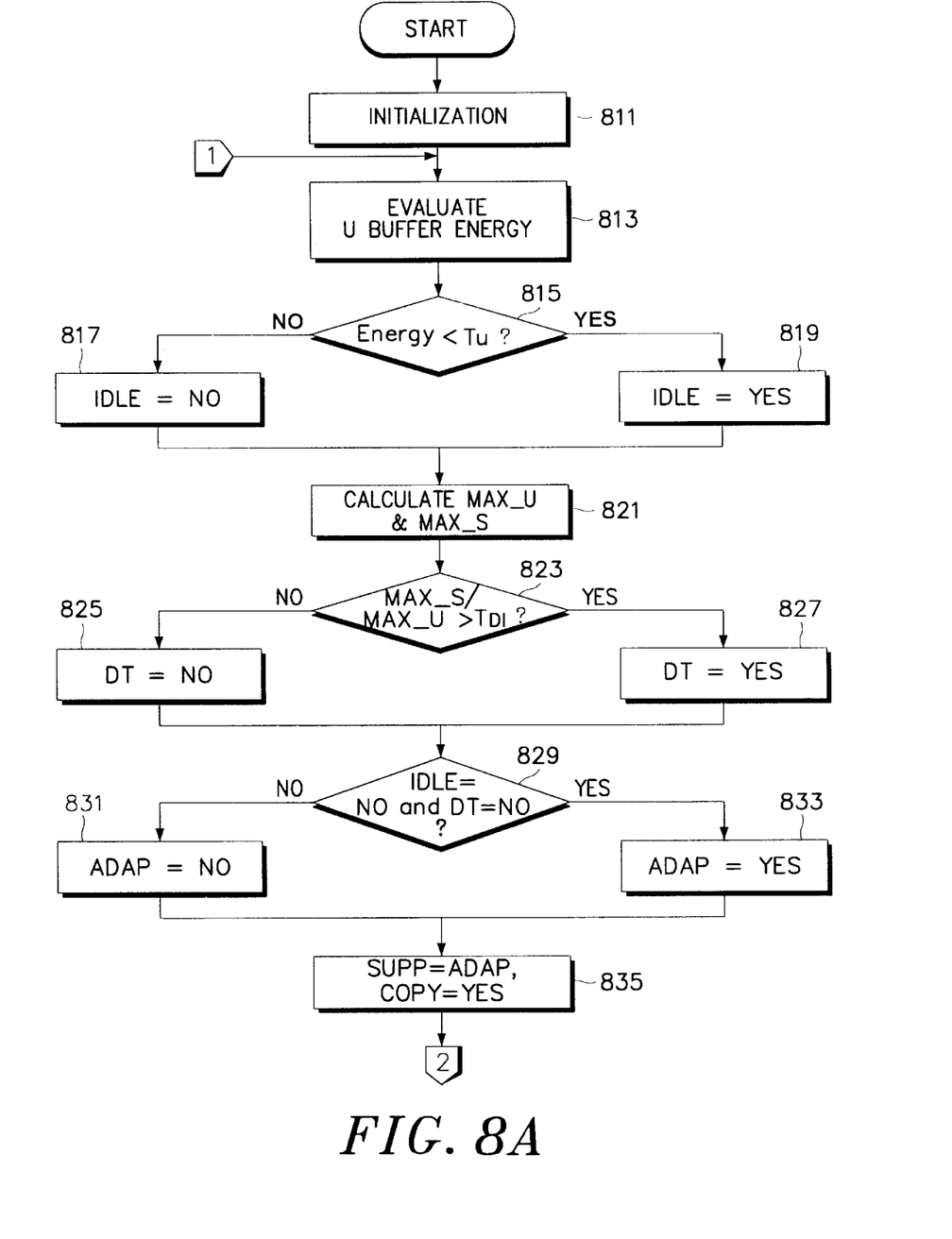
FIGS. 8A to 8C show a flowchart for canceling the echo signal according to an embodiment of the present invention.

Now, referring to FIG. 8A, at a step 811, the echo canceler 20 sets all the coefficients of the adaptive filter 21 and the fixed filter 22 to "0", sets an internal flag ACT to "2" (ACT=2), and sets the counter to "0". Then, at the beginning of the 20 msec frame, the echo canceler 20 establishes the operation mode based on the signal values stored in the voice signal buffer and the echo signal buffer. For that purpose, the echo canceler 20 evaluates the energy of the voice signal buffer at a step 813, and compares the evaluated energy with a threshold value Tu at a step 815. As the result of the comparison, if the energy of the voice signal buffer is less than the threshold value Tu, a flag IDLE is set to "YES" (IDLE=YES) at a step 817. However, if the energy of the voice signal buffer is greater than the threshold value Tu, the flag IDLE is set to "NO" (IDLE=NO) at a step 819.

Then, at a step 821, the maximum absolute values MAX_U and MAX_S of the voice signal buffer and the echo signal buffer are evaluated. It is checked at a step 823 whether or not MAX_S/MAX_U>$T_{DT}$. If MAX_S/MAX_U is less than the threshold value $T_{DT}$, a flag DT is set to "NO" (DT=NO) at a step 825. However, if MAX_S/MAX_U is higher than the threshold value $T_{DT}$, the flag DT is set to "YES" (DT=YES) at a step 827. Thereafter, the status of the flags IDLE and DT is checked at a step 829. As the results of checking the IDLE and DT flags, if IDLE=NO and DT=NO, a flag ADAP is set to "YES" (ADAP=YES) at a step 833. If not, the flag ADAP is set to "NO" (ADAP=NO) at a step 831. Thereafter, at a step 835, a flag SUPP is set to "ADAP" (SUPP=ADAP), and a flag COPY is set to "YES" (COPY=YES).

Figure 8B:
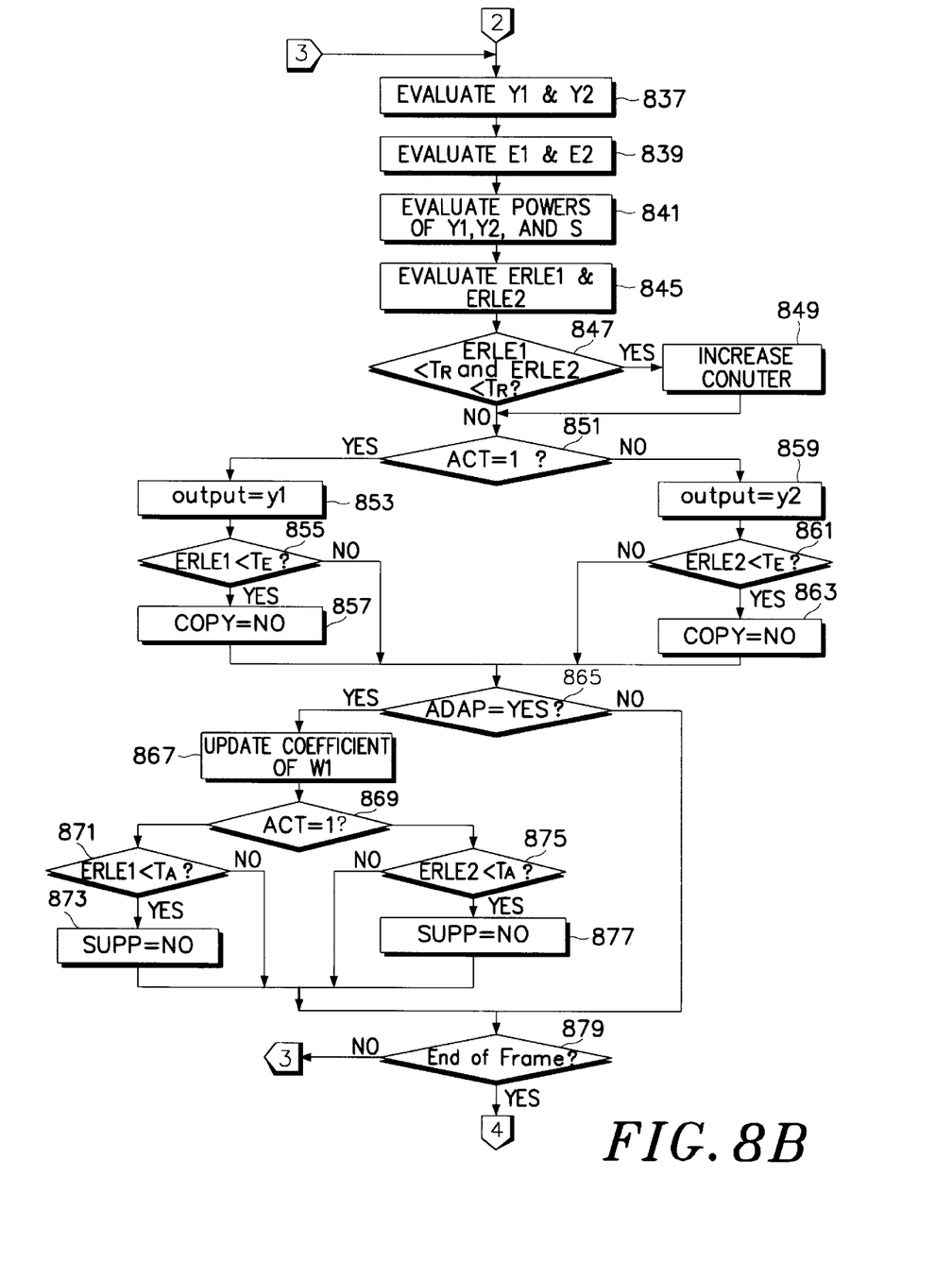

Next, referring to FIG. 8B, at a step 837, the echo canceler 20 receives the first voice signal U of the voice signal buffer to evaluate the first and second echo estimation signals y1 and y2 generated from the adaptive filter 21 and the fixed filter 22, and evaluates the first and second echo-canceled signals e1 and e2 at a step 839. Here, the second voice signal S includes the echo signal, and the adders 23 and 24 evaluate the first and second echo-canceled signals e1 and e2 in which e1=S−y1 and e2=S−y2, respectively. Then, at a step 841, instantaneous powers of the signals y1, y2 and S are calculated. At a step 845, a power difference between the signal S and the signal e1 and a power difference between the signal S and the signal e2 are calculated in terms of decibels (dB), to generate ERLE1 and ERLE2. Here, the calculated values represent, in terms of power, how much the adaptive filter 21 and the fixed filter 22 cancel the echo signals. At a step 847, if it is judged that ERLE1 and ERLE2 are less than a threshold value $T_R$, the counter increases by one at a step 849.

The mode controller 25 analyzes a value of the internal flag ACT at a step 851, to select a final output. That is, if ACT=1 at the step 851, the mode controller 25 selects the first echo-canceled signal e1 from the adder 23 at a step 853. Then, the mode controller 25 checks at a step 855 whether ERLE1 is less than a threshold value $T_E$. If ERLE1 is less than the threshold value $T_E$, the flag COPY is set to "NO" (COPY=NO) at a step 857. However, if ACT=2 at the step 851, the mode controller 25 selects the second echo-canceled signal e2 from the adder 24 at a step 859. Then, at a step 861, the mode controller 25 checks whether ERLE2 is less than the threshold value $T_E$. If ERLE2 is less than the threshold value $T_E$, the flag COPY is set to "NO" (COPY=NO) at a step 863.

Next, an operation of updating the coefficients of the adaptive filter 21 will be described in detail hereinbelow. The flag ADAP represents whether the coefficient of the adaptive filter 21 is updated or not. The flag ADAP is checked at a step 865. If ADAP=YES, the coefficient of the adaptive filter 21 is updated, at a step 867, by using the NLMS adaptive algorithm. Thereafter, through steps 869 to 877, ERLE1 and ERLE2 are compared with a threshold value $T_A$. If ERLE1 and ERLE2 are less than the threshold value $T_A$, the flag SUPP is set to "NO" (SUPP=NO). Then, the procedure checks at a step 879 whether it is the end of the frame. If not so, the procedure returns to the step 837 to repeat the above mentioned process.

Figure 8C:
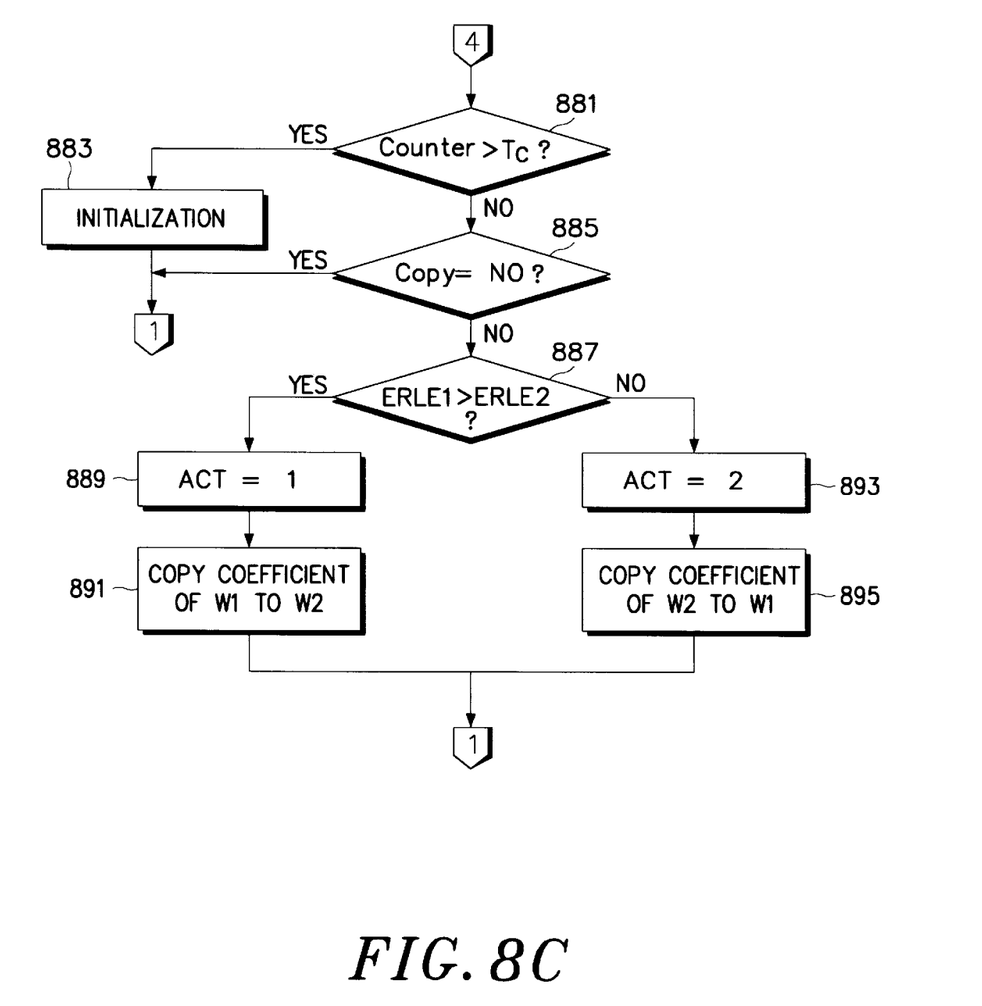

Upon performing the procedure of FIG. 8B with respect to 160 sample inputs all and completing one frame (i.e., 160 samples), the echo canceler 20 performs a post-frame processing as shown in FIG. 8C.

Referring to FIG. 8C, if the counter value is greater than a predetermined threshold value $T_C$ at a step 881, the procedure is initialized at a step 883 and returns to the step 813 of FIG. 8A. Then, the procedure initializes all the values of the echo canceler 20 and starts the next frame. However, if the counter value is less than the predetermined threshold value $T_C$ at the step 881, the procedure checks the status of the flag COPY at a step 885. If COPY=NO, the procedure returns to a step 813 to start the next frame.

However, if the flag COPY is set to "YES" (COPY=YES) at the step 885, ERLE1 is compared with ERLE2 at a step 887. If ERLE1>ERLE2, the flag ACT is set to "1" (ACT=1) at a step 889, and the coefficient of the adaptive filter 21 is copied to the fixed filter 22 at a step 891. On the contrary, if ERLE1<ERLE2, the flag ACT is set to "2" (ACT=2) at a step 893, and the coefficient of the fixed filter 22 is copied to the adaptive filter 21 at a step 895. Thereafter, the procedure returns to the step 813 to perform the echo cancellation with respect to the next frame.

The value of the flag SUPP is transferred to the encoder 30, which is a variable rate vocoder, IS-96A, for use in the CDMA digital cellular system. The variable rate vocoder varies the rate according to the input signal level. In particular, for a ⅛ rate, the vocoder makes the packet such that the white noise has the same level as the input level generated, instead of just compressing the input signal as it is. The rate of the encoder 30 is determined by the rate determiner 31 according to the SUPP value output from the mode controller 25. That is, if the flag SUPP is set, the rate of the encoder 30 is unconditionally set to ⅛.

As can be clearly understood from the foregoing descriptions, the echo canceler of the invention includes the adaptive filter and the fixed filter. In case the adaptive filter is more effective in canceling the echo signal, the fixed filter copies the filter coefficients from the adaptive filter, and the adaptive filter continues to be adaptive. One of the outputs from the adaptive filter and the fixed filter is selected to generate the final output signal of the echo canceler, based on ERLEs of the filters.

The voice codec in the CDMA system is processed by the frame unit, thereby resulting into an improvement of the performance of the echo canceler without additional transmission time delay. Therefore, the echo canceler may operate in any situation, particularly in the CDMA digital cellular system.

Although various preferred embodiments of the present invention have been described in detail hereinabove, it should be clearly understood to those skilled in the art that many variations and/or modifications of the basic inventive concepts herein taught may fall within the spirit and scope of the present invention as defined in the appended claims.

What is claimed is:

1. An echo canceler for canceling an echo signal mixed with an input signal received from a hybrid circuit, comprising:
    an adaptive filter for receiving the input signal to generate a first echo estimation signal according to a filter coefficient thereof:
    a fixed filter for receiving the input signal to generate a second estimation signal according to a filter coefficient thereof,
    a first adder for subtracting said first echo estimation signal from the input signal received from the hybrid circuit to generate a first echo canceled signal; and
    a mode selector having power determination means for determining a power value for the input signal, a first power difference between the power value of the input signal and a power value of the first echo-canceled signal, and a second power difference between the power value of the input signal and a power value of the second echo-canceled signal, said mode selector selectively outputting one of said first and second echo-canceled signals based on the determinations made by the power determination means, whereby when the first echo-canceled signal is selected, the adaptive filter is a filter in use and the fixed filter is a filter not in use, and when the second echo-canceled signal is selected, the fixed filter is the filter in use and the adaptive filter is the filter not in use, and wherein the filter coefficient of the filter in use is copied to the filter not in use.

2. The echo canceler as recited in claim 1 further comprises a non-linear processor for receiving the echo-canceled signals and for lowering a level of residual echo of the echo-canceled signal.

3. The echo canceler as recited in claim 1 wherein the filter coefficient of the adaptive filter is updated according to a normalized least mean square adaptive algorithm.

4. The echo canceler as recited in claim 1 wherein the mode controller selects the outputted echo-canceled signal based on a lower echo-canceled signal power of its respective filter.

5. A CDMA (Code Division Multiple Access) digital cellular system comprising:
    an echo canceler for canceling an echo signal mixed in an input signal received from a hybrid circuit including:
        an adaptive filter for receiving the input signal to generate a first echo estimation signal according to a filter coefficient thereof,
        a fixed filter for receiving the input signal to generate a second echo estimation signal according to a filter coefficient thereof,
        a first adder for subtracting said first echo estimation signal from the input signal received from the hybrid circuit to generate a first echo-canceled signal,
        a second adder for subtracting said second echo estimation signal from the input signal received from the hybrid circuit to generate a second echo-canceled signal, and
        a mode selector having power determination means for determining a power value for the input signal, a first power difference between the power value of the input signal and a power value of the first echo-canceled signal, and a second power difference between the power value of the input signal and a power value of the second echo-canceled signal, said mode selector selectively outputting one of said first and second echo-canceled signals based on the determinations made by the power determination means, and generating a non-linear process control signal, whereby when the first echo-canceled signal is selected, the adaptive filter is a filter in use and the fixed filter is a filter not in use, and when the second echo-canceled signal is selected, the fixed filter is the filter in use and the adaptive filter is the filter not in use, and wherein the filter coefficient of the filter in use is copied to the filter not in use; and
    an encoder including:
        a rate determiner for determining a rate based on said non-linear process control signal and receiving the selected echo-canceled signal output from the mode controller, and
        a voice compressor for compressing the echo-canceled signal output from the rate determiner according to the rate determined by the rate determiner.

6. The CDMA (Code Division Multiple Access) digital cellular system as recited in claim 5 wherein the mode controller selects the outputted echo-canceled signal based on a lower echo-canceled signal power of its respective filter.

7. The CDMA (Code Division Multiple Access) digital cellular system as recited in claim 5 wherein the filter coefficient of the adaptive filter is updated according to a normalized least mean square adaptive algorithm.

8. A method for canceling an echo signal in a CDMA digital cellular system including an echo canceler having an adaptive filter and a fixed filter, and an encoder having a voice compressor, comprising the steps of:

generating a first echo estimation signal from the adaptive filter according to a filter coefficient thereof;

generating a second echo estimation signal from the fixed filter according to a filter coefficient thereof;

subtracting said first echo estimation signal from an input signal received from a hybrid circuit to generate a first echo-canceled signal;

subtracting said second echo estimation signal from the input signal to generate a second echo-canceled signal;

determining an instantaneous power value for the input signal;

determining a first power difference between the instantaneous power value of the input signal and a power value of the first echo-canceled signal, and a second power difference between the instantaneous power value of the input signal and a power value of the second echo-canceled signal; and selectively outputting one of said first and second echo-canceled signals based on the determined power differences, of which echo component is canceled relatively more than that of the other, and generating a non-linear process control signal, whereby when the first echo-canceled signal is selected, the adaptive filter is a filter in use and the fixed filter is a filter not in use, and when the second echo-canceled signal is selected, the fixed filter is the filter in use and the adaptive filter is the filter not in use, and wherein the filter coefficient of the filter in use is copied to the filter not in use.

9. The method for canceling an echo signal according to claim 8, wherein the step of generating a first echo estimation signal includes:

receiving an input signal;

generating a first echo estimation signal from the adaptive filter; and offsetting the first echo estimation signal against the input signal for canceling.

10. The method for canceling an echo signal according to claim 8, wherein the step of generating a second echo estimation signal includes:

receiving an input signal;

generating a second echo estimation signal from the fixed filter; and offsetting the second echo estimation signal against the input signal for canceling echo.

11. The method for canceling an echo signal according to claim 8, further comprising a step of causing said encoder to determine a rate according to said non-linear process control signal to process the selectively outputted echo-canceled signal.

12. The method for canceling an echo signal according to claim 8, wherein the step of selectively outputting further comprises comparing the first and second power differences derived from subtracting the power value of the first and second echo-canceled signals from the instantaneous power value of the input signal.

* * * * *